March 23, 1926.
J. S. LOCKWOOD
1,578,149
CHILD'S TWO-WHEEL VEHICLE
Filed Oct. 30, 1923    2 Sheets-Sheet 2
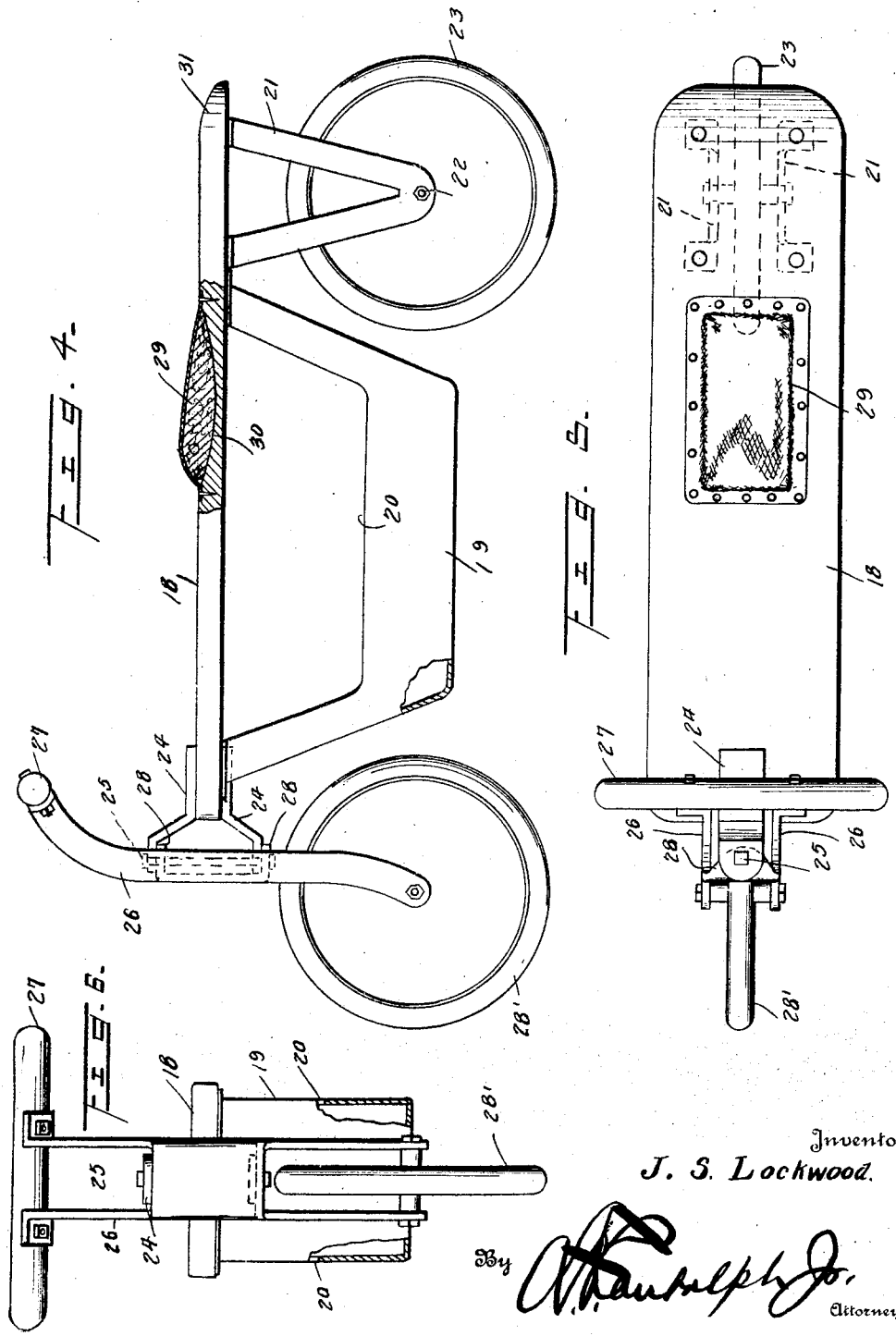
Inventor
J. S. Lockwood.

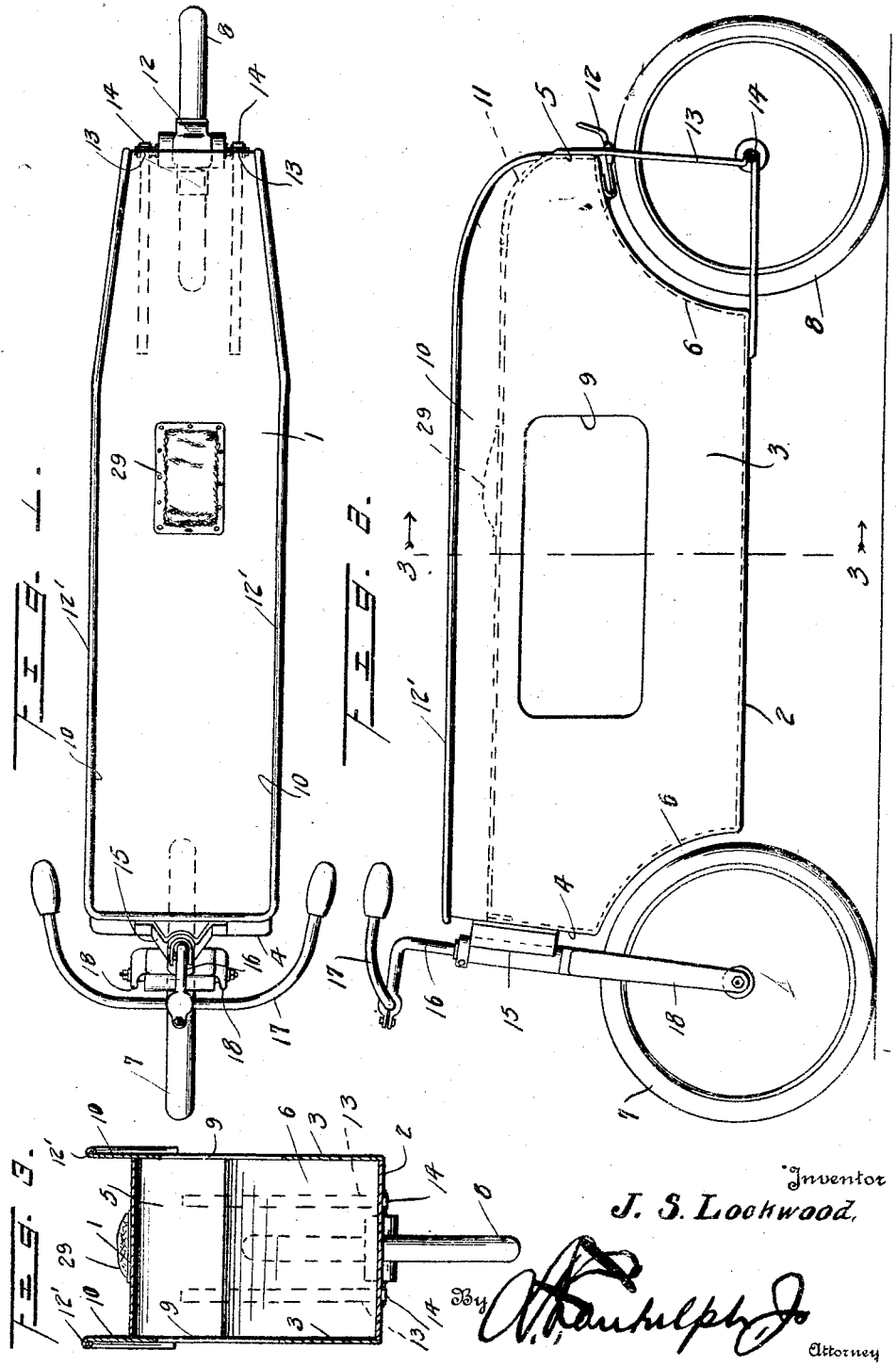

Patented Mar. 23, 1926.

1,578,149

UNITED STATES PATENT OFFICE.

JOHN S. LOCKWOOD, OF CLEVELAND, OHIO.

CHILD'S TWO-WHEEL VEHICLE.

Application filed October 30, 1923. Serial No. 671,712.

*To all whom it may concern:*

Be it known that I, JOHN S. LOCKWOOD, a citizen of the United States, residing at Cleveland, in the county of Cuyahoga and State of Ohio, have invented certain new and useful Improvements in Children's Two-Wheel Vehicles; and I do hereby declare the following to be a full, clear, and exact description of the invention, such as will enable others skilled in the art to which it appertains to make and use the same.

This invention relates to a vehicle designed more particularly for children and adapted to be propelled by a pushing action and has for its object to provide a vehicle of the type aforesaid which may be utilized as a parcel carrier and which will conveniently support the child in position so that a brake may be applied for decelerating motion when coasting or when it is required to reduce the speed of the vehicle or bring the same to a stop.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention Referring to the accompanying drawings forming a part of the application, Figure 1 is a top plan view of a vehicle embodying the invention, Figure 2 is a side view thereof, Figure 3 is a vertical transverse section on the line 3—3 of Figure 2 looking to the rear as indicated by the arrows, Figure 4 is a side view of a modified form of vehicle, parts being broken away, Figure 5 is a top plan view of the modification, and Figure 6 is a front view, parts being broken away.

Corresponding and like parts are referred to in the following description and designated in the several views of the drawings by like reference characters.

The vehicle comprises an elongated hollow body preferably constructed of metal and comprises a top 1, a bottom 2, sides 3 and ends 4 and 5, the lower portions of each being inwardly curved as indicated at 6 to provide clearance for the wheels 7 and 8 which have a tandem arrangement. An opening 9 is provided in each of the sides 3 to admit of ready access to the interior of the body for depositing articles or packages therein or removing them therefrom. The forward end and the sides of the body are extended above the top 1 a short distance to provide a guard to prevent the limb of the child from slipping when the vehicle is in operation. The rear portion of the top 1 is curved downwardly as indicated at 11 to conform to the instep of the foot so that the toe may conveniently engage a brake 12 and admit of instant and effective application of the brake when required. The upper marginal portion 10 of the front and sides projecting above the top 1 is reinforced as indicated at 12'. The rear portion of the body slopes inwardly as indicated most clearly in Figure 1.

Brackets 13 are attached to the rear end 5 and the rear portion of the bottom 2 and receive an axle 14 upon which the wheel 8 is mounted. The brake 12 consists of a stout spring having an end recurved and attached to the upper end of the incurved portion 6 at the rear of the body. The intermediate portion of the spring conforms to the tire of the wheel 8 and the rear end is disposed a short distance in rear of the body and is deflected upwardly to receive the toe of the rider whereby a slight pressure of the foot instantly and effectively applies the brake.

A bracket 15 is attached to the front end 4 of the body and receives the steering post 16 which is provided at its upper end with the handle bar 17 and at its lower end with a fork 18 which receives the axle of the front or steering wheel 7.

In practice the child using the vehicle kneels upon the top 1 with the toe portion of the foot extending over the curved part 11 and in engagement with the brake 12. The other foot is utilized to propel the vehicle by a pushing action in a manner well understood in vehicles of the kind to be propelled by a pushing action.

In the modification shown in Figure 4 and the detail views thereof, the vehicle comprises a board 18 which is relatively narrow and long. A metal box 19 is suspended from the board 18 and constitutes a receptacle for receiving parcels and luggage generally. Openings 20 are formed in the sides of the box 19 to admit of articles being deposited in the box or removed therefrom as required. Brackets 21 depend from the rear portion of the board 18 and receive an axle 22 upon which is mounted a wheel 23. Companion brackets 24 are secured to the top and bottom of the board 18 and project forwardly therefrom and have the projecting ends diverge and apertured to receive a pin 25 which pivotally connects the fork 26 thereto, said fork being provided at its upper end with a handlebar 27 and at its lower end with a wheel 28. The fork 26 is preferably constructed of sheet metal having the form substantially as shown and provided with rearwardly extending ears 28 which overlap the front ends of the brackets 24 and are pivoted thereto by means of the pin 25. A knee cushion 29 is provided upon the top side of the board to prevent annoying pressure and soreness to the knee of the child using the vehicle. A depression 30 is formed in the top side of the board 18 opposite the cushion 29 to insure a distribution of the filling and prevent the formation of a bump which would tend to cause the knee to slip. The upper rear end of the board 18 is rounded, as indicated at 31, to conform to the foot and add to the comfort of the child.

A knee pad 29 is attached to the top 1 of the vehicle shown in Figure 1 and the detail views thereof and this pad may be of any construction and attached to the top in any preferred way.

Having thus described the invention, what I claim is:—

A vehicle of the character specified comprising a receptacle having openings in its side walls for access to its interior and having the lower portions of the front and rear ends inwardly curved, a bracket secured to the front of the receptacle, a steering post carried by said bracket and having its lower end forked, a steering wheel journaled in said forked end of the steering post, angular brackets secured to the rear end and bottom of said receptacle and transversely spaced, a wheel journaled in said brackets, a brake secured to the inwardly curved portion at the rear of the receptacle, said brake having an upwardly extending portion for engagement in setting the brake, the sides of said receptacle extended above its top to form guards, and a cushion secured on the top.

In testimony whereof I affix my signature.

JOHN S. LOCKWOOD.